Nov. 4, 1958 — R. E. NADOLSKEY — 2,858,998
FISHING REELS WITH FRICTION BRAKES
Filed March 1, 1956 — 2 Sheets-Sheet 1

INVENTOR.
ROBERT E. NADOLSKEY
BY
Reynolds, Beach & Christensen
ATTORNEYS

Nov. 4, 1958 R. E. NADOLSKEY 2,858,998
FISHING REELS WITH FRICTION BRAKES
Filed March 1, 1956 2 Sheets-Sheet 2

INVENTOR.
ROBERT E. NADOLSKEY
BY
Reynolds, Beach & Christensen
ATTORNEYS ically preferred form.

United States Patent Office 2,858,998
Patented Nov. 4, 1958

2,858,998

FISHING REELS WITH FRICTION BRAKES

Robert E. Nadolskey, Tacoma, Wash.

Application March 1, 1956, Serial No. 568,917

7 Claims. (Cl. 242—84.5)

This invention relates to improvements in fishing reels and more particularly to those having an adjustable drag or brake mechanism therein. The invention is herein illustratively described by reference to its preferred form as applied to a fishing reel of the type suitable for use in spinning or mooching as those terms are understood in the art of fishing for salmon in the Pacific Northwest; however, it will be recognized that the invention in its broader aspects may vary as to details of form and application. The present application is a continuation-in-part of application Serial No. 498,263, filed March 29, 1955, now abandoned.

A principal object of the invention is a fishing reel having an improved drag or brake mechanism, more specifically one wherein the application of braking force to the reel spool may be effected between zero value and maximum value smoothly and at a relatively uniform rate. An important related object is such a brake mechanism wherein the complete range of braking force application may be traversed by a relatively short movement of the control member. Also it is important that the adjustable brake mechanism remain in any adjusted condition throughout its entire working range, independently of rotation of the reel spool in either direction. The invention overcomes the problem of some reels having a controllable drag, the control element of which must be rotated through many revolutions in order to completely free the spool from brake force, and even then there is a tendency in some reels for a small residual brake force to remain, although the control element is retracted as fully as possible.

A specific object of the present invention is an adjustable reel brake the complete release of which may be effected positively and reliably, and especially so by relatively small movement of the brake control element.

Another object of the invention is a relatively compact, simple and reliable adjustable-drag type reel which is highly efficient for the types of fishing referred to above.

In accordance with an important feature of the invention a collar member, nonrotatively but slidably encircling the reel post has a lateral projection thereon adjacent the reel spool, which projection forcibly lifts the frictional brake means out of engagement with the reel spool accompanying retraction movement of the control nut. Moreover, such frictional brake means comprises two washers of frictional material rotatively encircling the collar member and respectively compressible against the spool face and the nut, together with a nonrotative annular member interposed between such washer members, both the washers and the annular member being slidable lengthwise of the collar member, whereby gradual variation in braking force may be effected throughout the entire range of the device, positive release of the brake achieved in the retracted position of the nut, and stable positioning of the control nut and brake elements maintained independently of spool movement.

These and other features, objects and advantages of the invention will become more fully evident from the following detailed description thereof by reference to the accompanying drawing illustrating the invention in its presently preferred form.

Figure 1:
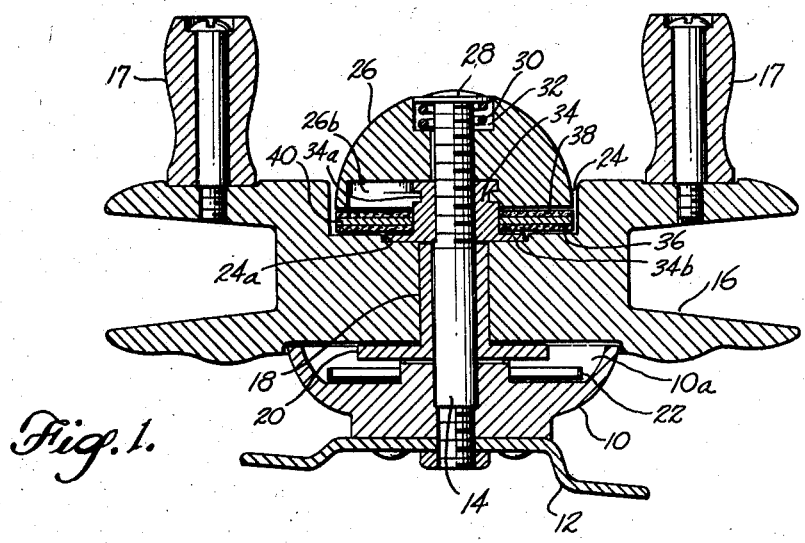
Figure 1 is an axial sectional view of a reel illustrating the preferred form of the novel brake mechanism.
Figure 2:
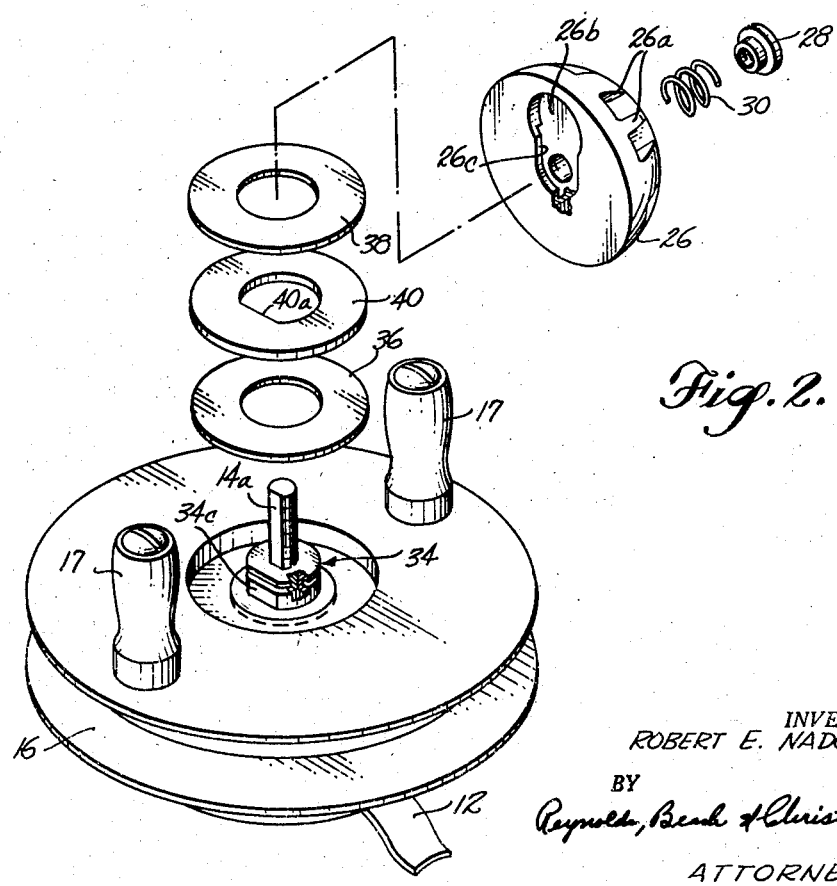
Figure 2 is an exploded perspective view thereof.

Referring to Figures 1 and 2, the reel comprises a base 10 having a reel seat 12 on one side thereof, with a post 14 rigidly secured to the base and projecting from the side thereof opposite from the reel seat. The spool 16 is rotatively journaled on the post 14 by an antifriction sleeve 18 preferably having a press fit in the central bore of the spool. In the actual reel on which the drawings were based this sleeve has a toothed flange 20 thereon received in a cavity 10a in the base 10, which, together with the spring means 22, form part of a click device constituting no part of the present invention and shown only for purposes of representation in the drawing. Any suitable click device or none at all may be employed in the reel since the same constitutes no part of the present invention. Handles 17 are provided at opposite locations on the outer face of the spool.

The side or face of the spool opposite from the base 10 has a large central recess 24 therein which serves to accommodate and house brake mechanism parts so that the same will not be exposed to dirt and foreign matter and will not present any problem of the fishing line becoming caught thereon. The post 14 projects materially beyond the exposed side of the spool, and a brake mechanism control nut 26 is threaded thereon. A removable head 28, such as a screw, secured to the projecting end of the post, limits the retraction movemenmt of the nut on the post. A helical spring 30 surrounding the post and received within a recess 32 in the end of the nut, between the recess base and the under side of the screw head 28, is preloaded and frictionally restrains the nut against rotation on the post so that the nut will not rotate too freely with the brake mechanism in its released condition. In the example the nut is of substantially hemispherical solid form having suitable flutes 26a or grip elements by which it may be grasped and turned manually with comparative ease. The base diameter of the nut is only slightly less than the diameter of the spool recess 24, and the base of the nut, i. e. the end thereof adjacent the spool is generally flat, although it is provided with a recess 26b therein of special configuration for a purpose to be described.

A generally cylindrical elongated collar member 34 nonrotatively encircles the post generally between the nut and the adjacent side of the spool. The bore through the collar member has a flat side complemental to the flat side 14a of the post, and this prevents rotation of the collar member relative to the bolt while permitting sliding of the collar member lengthwise of the bolt. Near the outer end of the collar member an annular groove 34a is formed on the exterior thereof, which groove slidably receives the projecting lip 26c at the entrance to the recess 26b in the base of the nut 26. Thus the collar member is constrained to move lengthwise of the bolt with the nut, while the nut is permitted to rotate relative to the collar member. In order to interengage the lip 26c in the collar member groove, the nut recess has an enlarged portion as seen in Figure 2 serving as an entrance for the end of the collar member. Following insertion of the collar member into the recess entrance the collar member is moved laterally toward the center of the nut where the lip 26c is caused to enter the groove 34a, as will be evident from the drawings.

The collar member 34 also has a lateral projection thereon in the form of a thin flange 34b on the end thereof adjacent the spool. With the collar member advanced against the spool as far as it can go, the flange 34b is received in a central recess 24a formed in the base of the housing recess 24 and the end face of the flange away from the spool is then depressed slightly below the surrounding base surface of the recess 24. Thus this flange does not interfere with frictional engagement between the surrounding base surface and the frictional element comprising the brake means.

Such frictional element comprises the thin washer 36 of frictional material, such as a compressed fiber material, which rotatably and slidably encircles the collar member 34 adjacent the spool. A second washer of frictional material 38 rotatably and slidably encircles the collar member adjacent the base of the nut 26. A third washer 40 preferably of metal, nonrotatively but slidably encircles the collar member 34 between the first two washers 36 and 38. Preferably all such washers are of equal outside diameter and equal inside diameter so that all three can slide lengthwise of the bolt relative to the spool, relative to the collar member and relative to each other, except the intermediate washer 40 has a flat 40a on one side of its aperture, which flat engages the flat side 34c on the collar member to prevent relative rotation therebetween. The aggregate thickness of the three washers only slightly exceeds the distance of separation between the base of the nut 26 and the adjacent side of the flange 34b, although the drawings illustrate to an exaggerated degree the difference between such aggregate thickness and such spacing.

When the control nut 26 is rotated on the post 14 in a direction to advance the nut toward the spool 16, the first fiber washer 36 is compressed against the spool's face and the second fiber washer 38 is compressed against the base of the nut. The degree of compression, of course, establishes the brake force application to the spool and the amount of drag imposed thereon when line is being reeled in or payed out from the spool. Since the intermediate washer 40 is nonrotative relative to the post 14, no rotational movement of the spool can affect the adjusted position of the control nut 26, hence the brake force application. In other words, the control nut 26 is completely rotatively isolated from the spool and vice versa. This isolation is unaffected by the degree of brake pressure application to the spool.

As the control nut 26 is retracted along the post 14 by opposite rotation of the nut thereon, the brake force application to the spool progressively diminishes as the fiber washers are permitted to decompress. The difference between the distance of separation between the flange 34b and the base of the nut and the aggregate thickness of three washers is such that upon continued retraction of the nut when the brake force application reaches a small value the flange 34b lifts the first washer 36 forcibly and positively from the reel face and the brake is thus completely released from the reel spool as desired. The spool is then completely free to rotate.

It will be apparent that the device is simple and compact and that it is very durable. When the spool is to be disassembled for cleaning and servicing, the screw 28 is removed from the post 14 and this permits removal of the spring 30, the nut 26 and with it the collar member 34 and the three washers 36, 38 and 40. With this latter assembly removed from the post, the collar member 34 may be removed from the nut and then the washers removed from the collar member.

Figure 3:
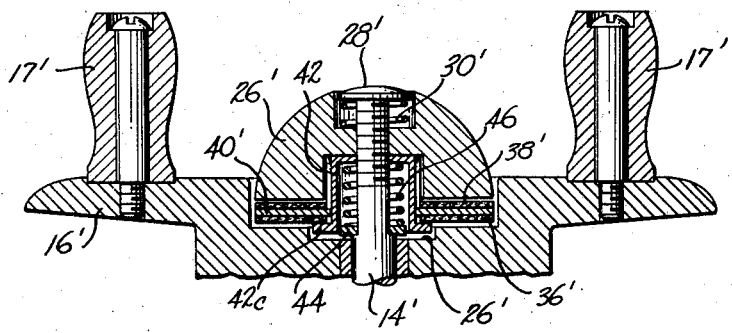
Figure 3 is an axial fragmentary sectional view of a reel illustrating a second form of the novel brake mechanism.
Figure 3:
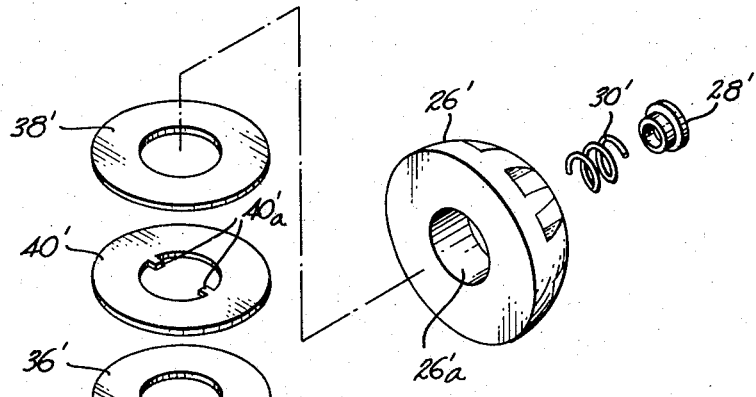
Figure 4:
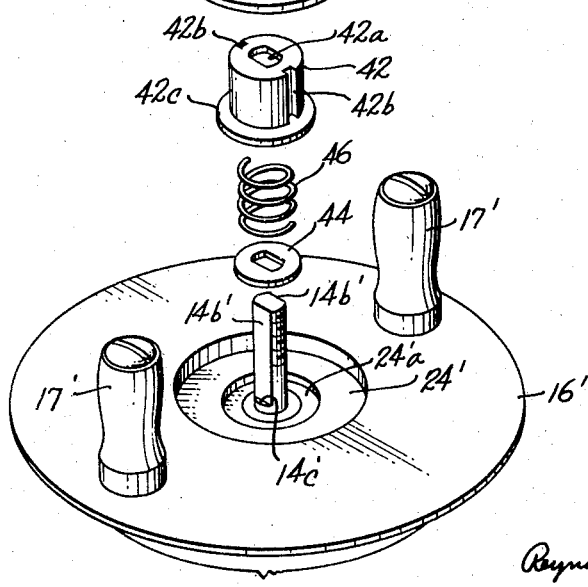
Figure 4 is an exploded perspective view thereof.

In the modified form shown in Figures 3 and 4 parts which correspond generally or specifically to those appearing in Figures 1 and 2 are designated by similar reference numerals primed. In this embodiment the threaded projecting end of the reel post or shaft 14' has two flats 14b' on opposite sides thereof. The cup-like collar member 42 has a central aperture 42a in its otherwise closed outer end which fits slidably but nonrotatively over the threaded end of the shaft 14'. A nonrotative washer 44, slipped over such shaft to rest against the shoulders 14c' formed at the ends of the flats 14b', serves as a base for the coil spring 46 housed within the collar member 42 and reacting outwardly against the apertured end thereof. The fiber washers 36' and 38' fit slidably and rotatively over the cylindrical portion of the collar member 42. The latter has two grooves 42b in respectively opposite sides thereof which receive the keys 40a' of the intermediate, nonrotative washer 40' so that such latter washer is free to slide lengthwise of the collar member but is constrained against rotation relative thereto, hence relative to the reel shaft 14'. The control nut 26' has a recess 26'a in the inner side thereof which accommodates the outer end of the collar member 42. The outer end of the collar member is maintained in contact with the base of the control nut recess by recoil force of spring 46. The spring 30' and nut 28' at the end of the shaft 14' serve the same purposes as the previous example. The collar member flange 42c located on the inner end thereof serves the same basic purpose as the flange 34b in the previous example.

However, in this second embodiment forcible lifting of of the brake elements, particularly the inner washer, out of braking contact with the spool face is accomplished by the resilient recoil force of the spring 46 acting against the collar member 42 so as to cause the flange 42c thereon to lift the innermost washer 36' from the spool face when the nut 26' is retracted on the shaft. This modified construction, using the spring 46 in lieu of a positive retractive interconnection between the control nut and washer-lifting flange, has the advantage of being somewhat less expensive to manufacture than the first embodiment.

It will be noted, in the operation of the device, that the base of the nut recess 26'a remains at all times in contact with the outer end of the collar member 42, and that the depth of the spool face recess 24'a below the base of the major recess 24' is sufficient to accommodate the flanged end of the cup-like collar member 42 with the nut advanced to its position of applying maximum braking force, through the friction washers, to the spool face. When the nut is retracted by counterrotation thereof on the reel shaft, brake pressure gradually diminishes, and as it approaches and reaches zero value, the spacings and dimensions of the parts are such that the flange 42c begins to lift the innermost washer 36' out of contact with the spool face by virtue of decompression of the spring 46. Thus, as in the previous embodiment the full range of braking force is traversed by comparatively short rotative movement of the control nut 26' and the forcible release action of the brake mechanism insures zero drag of brake elements on the reel spool the instant the retracting control nut relieves the washers from compression.

I claim as my invention:

1. In a fishing reel having a reel base with a reel seat thereon and a spool rotatively mounted on said base, the combination comprising a post rigidly mounted on said base and projecting therefrom through the center of said spool and beyond one face thereof, a brake applying nut threaded on said post for movement thereof toward and from said spool face by rotation of said nut manually, a collar member encircling said post between said nut and said spool, means constraining said collar member against rotation relative to said post while permitting sliding thereof lengthwise of said post, said collar member having a transverse flange on the end thereof adjacent said spool, said spool face having a central recess therein for receiving said flange with said collar member advanced against said spool, cooperating means on said nut and said collar member constraining the same for conjoint movement lengthwise of said post while permitting relative rotation therebetween, and annular frictional contact means surrounding said collar member between the flange thereof and said nut to be pressed into frictional engagement with said spool face surrounding said recess by advancement of said nut toward said spool for applying braking force to said spool adjustable in amount determined by the rotated position of said nut, and to be lifted positively from frictional engagement with said spool face by said collar member flange by adjustive movement of said nut hence of said collar member away from said spool, said annular frictional contact means comprising a first washer of frictional material slidably and rotatively encircling said collar member adjacent the flange thereof, a second washer of frictional material slidably and rotatatively encircling said collar member between said first washer and said nut, and an annular member interposed between said first and second washers and slidably but non-rotatively encircling said collar member.

2. The fishing reel combination defined in claim 1, wherein the nut is recessed to receive the adjacent end on the collar member therein and wherein the recess wall in the nut and the exterior wall of the collar member have, one an annular groove and the other a projection slidably entering such groove to constrain such nut and collar member for conjoint movement thereof lengthwise of the post while permitting rotation of said nut relative thereto.

3. A fishing reel comprising a reel base having a reel seat on one side thereof mountable on a fishing pole, a post rigidly mounted on said base projecting laterally from the opposite side thereof, a reel spool rotatively journalled on said post with the latter projecting beyond the face of the spool opposite from said base, a nut threaded on the projecting end of said post, a collar member encircling said post between said nut and said spool and having a lateral projection thereon adjacent said spool, said nut and said collar member being formed relatively and interengaged for free relative rotation and conjoint movement lengthwise of said post, said collar member and said post being formed relatively to prevent rotation of said collar member while permitting sliding thereof lengthwise of said post, a first washer of frictional material rotatively encircling said collar member adjacent said spool and frictionally engageable with such spool, a second washer of frictional material rotatively encircling said collar member adjacent said nut and frictionally engageable therewith, and an annular member non-rotatively encircling said collar member between said washers and frictionally engageable with both washers, said annular member and said washers being slidable relative to each other and said collar member lengthwise of said post to permit compressing said first washer against said spool and said second washer against said nut by advancement of said nut toward said spool and release of such compression by retraction movement of said nut, said spool having a recessed portion receiving said collar member projection with the nut advanced to compress said washers, said projection underlying a portion of said first washer and lifting the same positively out of frictional engagement with said spool by retraction movement of said nut.

4. The fishing reel defined in claim 3, wherein the side of the reel spool opposite from the reel base has a brake housing recess therein receiving and housing the washers, annular member and the adjacent end portion of the nut and wherein the collar member projection comprises a thin lateral flange on the end thereof adjacent the spool, said spool having a central recess therein in the base of the brake housing recess for receiving said flange.

5. The fishing reel defined in claim 4, wherein the nut has a central recess in the end thereof opposite from the spool, surrounding the projecting end of the post, a removable transverse head on the end of the post closing said latter recess, and a preloaded helical spring encircling the post between said head and the base of said latter recess for applying frictional restraint to rotation of said nut, removal of said head permitting disassembly of the reel by withdrawing from said post said spool, collar member, annular member, washers and nut.

6. In a fishing reel having a reel base with a reel seat thereon and a spool rotatively mounted on said base, the combination comprising a post rigidly mounted on said base and projecting therefrom through the center of said spool and beyond one face thereof, a brake applying nut threaded on said post for movement thereof toward and from said spool face by rotation of said nut manually, a collar member encircling said post between said nut and said spool, means constraining said collar member against rotation relative to said post while permitting sliding thereof lengthwise of said post, whereby advancement of said nut toward said spool presses said collar member toward said spool, said collar member having a transverse flange on the end thereof adjacent said spool, said spool face having a central recess therein for receiving said collar member advanced against said spool, spring means encircling said post and including a spring reacting from said post against said collar member to urge the latter by recoil forcibly away from said spool face when permitted by and accompanying retraction movement of said nut away from said spool face, and annular frictional contact means adjacent said collar member between the flange thereof and said nut to be pressed into frictional engagement with said spool face surrounding said recess by advancement of said nut toward said spool for applying braking force to said spool adjustable in amount determined by the rotated position of said nut, and to be lifted forcibly from frictional engagement with said spool face by said collar member flange by adjustive movement of said nut hence of said collar member away from said spool.

7. The fishing reel combination defined in claim 6, wherein the collar member is hollow to receive the spring, and wherein the spring means further comprises a washer against which the spring seats and which is secured on the post against sliding lengthwise thereof in the direction away from the nut.

References Cited in the file of this patent

UNITED STATES PATENTS

| | | |
|---|---|---|
| 2,298,481 | Hayes | Oct. 13, 1942 |
| 2,344,209 | Lowe | Mar. 14, 1944 |
| 2,347,173 | Coxe | Apr. 25, 1944 |
| 2,569,006 | King | Sept. 25, 1951 |

FOREIGN PATENTS

| | | |
|---|---|---|
| 6,044 | Great Britain | Mar. 13, 1906 |
| 496,163 | Great Britain | Nov. 25, 1938 |